United States Patent
Ahmed et al.

(10) Patent No.: US 12,495,808 B2
(45) Date of Patent: Dec. 16, 2025

(54) EDIBLE FILM FOR FOOD PRESERVATION

(71) Applicant: United Arab Emirates University, Al Ain (AE)

(72) Inventors: Zienab F R Ahmed, Al Ain (AE); Navjot Kaur, Al Ain (AE); Abdel-Hamid Ismail Mourad, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/538,713

(22) Filed: Dec. 13, 2023

(65) Prior Publication Data

US 2025/0194616 A1    Jun. 19, 2025

(51) Int. Cl.
*A23B 2/733* (2025.01)
*A23B 2/754* (2025.01)
*A23B 2/771* (2025.01)
*A23B 7/154* (2006.01)
*A23B 7/16* (2006.01)
*B65D 65/46* (2006.01)

(52) U.S. Cl.
CPC ............... *A23B 2/733* (2025.01); *A23B 2/754* (2025.01); *A23B 2/771* (2025.01); *A23B 7/154* (2013.01); *A23B 7/16* (2013.01); *B65D 65/463* (2013.01)

(58) Field of Classification Search
CPC .... A23L 3/3472; A23L 3/3508; A23L 3/3544; A23B 7/154; A23B 7/16; B65D 65/463
USPC .......................................................... 426/138
See application file for complete search history.

(56) References Cited

FOREIGN PATENT DOCUMENTS

EP            3072401 A1 *  9/2016  ............... A01L 1/04

* cited by examiner

*Primary Examiner* — Subbalakshmi Prakash
(74) *Attorney, Agent, or Firm* — Hayes Soloway PC

(57) ABSTRACT

The present disclosure discloses an edible film for food preservation, the edible film comprising at least 90 wt % of a first component. The first component comprises chitosan and aloe vera extract. Named parts comprised in the first component make up 100 wt % of the first component. The present disclosure also discloses a method for forming an edible film, the method comprising the steps of extracting aloe vera gel; dissolving chitosan into an aqueous solution; mixing the aloe vera gel with the chitosan solution; casting a film solution; and drying the film to form the edible film. The present disclosure also discloses a packaging for food comprising the edible film.

12 Claims, 4 Drawing Sheets

EDIBLE FILM FOR FOOD PRESERVATION

TECHNICAL FIELD

The present disclosure relates to an edible film for food preservation. More specifically, but not exclusively, the present disclosure relates to an aloe vera-based edible film for food preservation.

BACKGROUND

Background description includes information that will be useful in understanding the present invention. It is not an admission that any of the information provided herein is prior art or relevant to the presently claimed invention, or that any publication specifically or implicitly referenced is prior art.

Food bioactive packaging is a technique of protecting fresh food items using biologically active material to maintain the freshness and shelf life of fresh products. Biologically active material within the packaging possesses antimicrobial and antioxidant activities and, together with their ability to form film, enhances their properties to be used as food packaging material.

Different materials have been tried to produce edible films/coats.

However, a deficiency with existing bioactive packaging is that they are not all bio-based, cost-effective, and sustainably coated. As consumers become more aware of sustainability and its positive consequences on the environment, these aspects of packaging become more important; therefore, their choice of market products is shifting towards more natural and sustainable materials. Existing food packaging materials need to become more economical, sustainable, and durable.

Edible films and coatings emerged as a boon for fresh produce industries as they have raised the market value of their products by increasing their product validity. Since this approach protects fresh products from external and internal damage, provides safety, increases shelf life, and maintains quality, it has been investigated as part of the packaging for food. The primary mechanism of action of edible films and coatings is to develop a thin layer or semi-permeable barrier around the product to minimize its contact with the external environment. This will subsequently create a protective and modified atmosphere around the fresh produce, which can preserve its freshness for a long time. If the film develops a very thick or extremely thin layer on a product surface, it may produce undesired results.

Important criteria used to develop optimum coating and films consider several parameters such as economic reliability, mechanical properties, thermal stability, sensory properties, and barrier properties. All these parameters are greatly influenced by the molecular weight and concentration of the material, the type of solvent used to prepare the coating, pH, temperature, and additives used. Therefore, it is a deep technical challenge to formulate a coating or develop a film with desired characteristics. Even minor differences in constituent parts, concentrations, temperature, pH, etc., can have a significant impact on the resultant film.

There is therefore a need for an improved packaging film that improves the quality and shelf life of various fruit and vegetable crops while being more sustainable, economical, and durable.

The present disclosure seeks to overcome at least one of the aforementioned problems. More specifically, but not exclusively, the present disclosure seeks to provide an improved edible film for food preservation.

SUMMARY

The present disclosure provides, according to a first aspect, an edible film for food preservation. The edible film comprises at least 90 wt % of a first component. The first component comprises chitosan and aloe vera extract. Named parts comprised in the first component make up 100 wt % of the first component.

By stating that the named parts comprised in the first component make up 100 wt % of the first component, it means that in embodiments where the named parts of the first component are chitosan and aloe vera extract, the total wt % of aloe vera extract and chitosan are 100 wt % of the first component. In embodiments where the wt % of the first component is 90 wt % of the edible film, that therefore means that the total wt % of aloe vera extract and chitosan in the edible film is 90 wt %.

If, in embodiments, a third part is named (such as lactic acid for example), then the total wt % of aloe vera extract, lactic acid, and chitosan would be 100 wt % of the first component. In such embodiments where the wt % of the first component is 90 wt % of the edible film, that therefore means that the total wt % of aloe vera extract, lactic acid and chitosan in the edible film would be 90 wt %.

Wt % is a standard industry term referring to a proportion of the total, by weight. The total may be the weight of the entire article, or a sub-part thereof.

The inventors have surprisingly found that the combination of both aloe vera extract and chitosan in the form of an edible film can be used to develop optimal film and can be used as coating materials for promoting the quality, shelf-life, and retard senescence and decay of various fresh horticulture produce during storage. The film has improved mechanical, thermal, rheological, antioxidant, chemical bonds, surface morphology, and color properties. By incorporating the edible film into food packaging, it has improved the coated material's mechanical, thermal, barrier, antioxidant, and antimicrobial properties.

The first component may comprise lactic acid.

The lactic acid may enhance the solubility of the chitosan in aqueous solution.

The first component may comprise up to 96 wt % aloe vera extract.

The first component may comprise between 2 and 10 wt % chitosan.

The first component may comprise between 2 and 10 wt % lactic acid.

The total wt % of aloe vera extract, chitosan, and lactic acid may add to 100 wt % of the first component.

The edible film may comprise at least 95 wt % of the first component.

The edible film may comprise at least 99 wt % of the first component.

The edible film may comprise substantially 100 wt % of the first component.

Substantially 100 wt % of the first component may be greater than 99.5 wt % of the first component.

Substantially 100 wt % of the first component may exclude negligible impurities that may naturally occur or otherwise. I.e., negligible impurities may not be considered when calculating the wt % of respective components/compositions.

According to a second aspect of the present disclosure there is provided a solution for the preparation of an edible film according to the first aspect. The solution comprises between 35-45 vol % aloe vera gel and between 55-65 vol % chitosan solution.

The chitosan solution may comprise between 0.5-1.5% w/v chitosan.

The chitosan solution may comprise between 0.9-1.1% w/v chitosan.

% w/v is a standard industry term meaning "weight per volume percentage concentration", which is calculated by taking the mass of solute in grams, divided by the volume of solution in milliliters, and multiplied by 100.

The chitosan solution may comprise between 0.5-1.5% v/v lactic acid.

The chitosan solution may comprise between 0.9-1.1% v/v lactic acid.

% v/v is a standard industry term meaning "volume per volume percentage", which is calculated by taking the volume of solute, divided by the total volume, and multiplied by 100.

The use of lactic acid may assist in dissolving the chitosan in aqueous solution.

The total vol % of both the aloe vera gel and the chitosan solution may be at least 99 vol %.

According to a third aspect of the present disclosure there is provided a method for forming an edible film for food preservation. The method comprised the steps of: extracting aloe vera gel from aloe vera; dissolving between 0.5-1.5% w/v chitosan into an aqueous solution to form a chitosan solution; mixing the aloe vera gel with the chitosan solution to form a first solution; casting a film solution into a film, the film solution comprising at least 90 vol % of the first solution; and drying the film to form the edible film.

The step of mixing may comprise mixing between 35-45 ml of the aloe vera gel with between 55-65 ml of the chitosan solution.

The aqueous solution may be lactic acid solution wherein the lactic acid solution comprises 0.5-1.5% v/v lactic acid in water.

The step of extracting may comprise blending and filtering to form the aloe vera gel.

The method may comprise a step of sterilizing the aloe vera gel by raising the temperature of the gel for a predetermined amount of time.

The temperature may be between 65 and 80 degrees Celsius.

According to a fourth aspect of the present disclosure there is provided a packaging for food comprising the edible film according to the first aspect.

It will be understood that features disclosed in relation to one aspect of the present disclosure may be applicable to or combinable with another aspect of the present disclosure, or vice versa.

BRIEF DESCRIPTION OF THE DRAWINGS

The manner in which the above-recited features of the present disclosure is understood in detail, a more particular description of the present disclosure, briefly summarized above, may be had by reference to embodiments, some of which are illustrated in the appended drawings. It is to be noted, however, that the appended drawings illustrate typical embodiments of the present disclosure and are therefore not to be considered limiting of its scope, for the present disclosure may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION OF THE DRAWINGS

The present disclosure relates to the field of food preservation, and more particularly to edible films for food preservation.

The principles of the present disclosure and their advantages are best understood by referring to FIG. 1 to FIG. 6. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
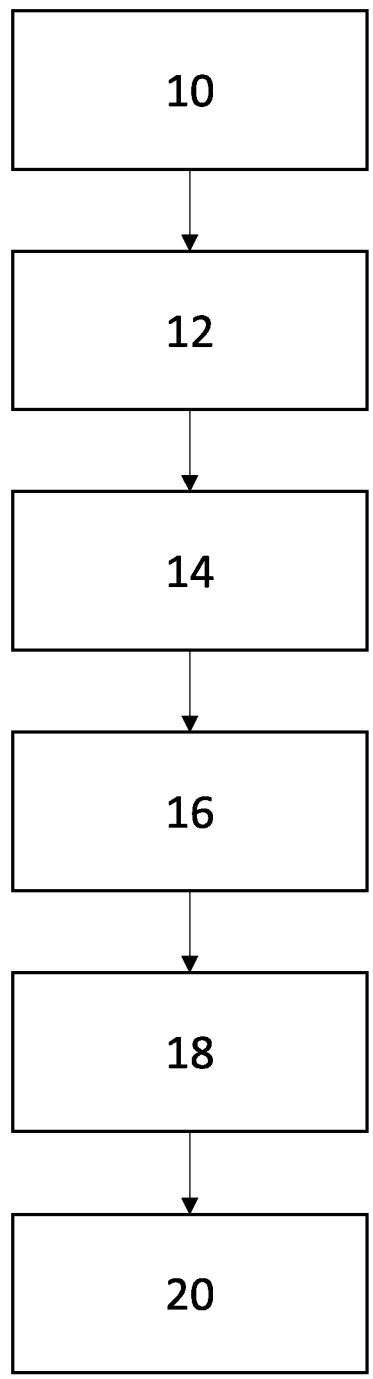
FIG. 1 shows a method for forming an edible film for food preservation according to an embodiment of the present disclosure.

FIG. 1 shows a method of forming an edible film according to an embodiment of the present disclosure.

In the extracting step 10, aloe vera gel is extracted from fresh Aloe Vera (Aloe barbadensis Miller) leaves. Aloe Vera (AV) has been selected for its therapeutic properties. It is a short perennial succulent xerophyte plant that belongs to the Aloaceae family, with more than 500 species existing worldwide. It comprises about 12 to 16 leaves with a thick layer of epidermis surrounding the mesophyll cells. Underneath the mesophyll cells, transparent jelly-like material is present, which is mainly composed of 98% of water, and the rest of the portion consists of carbohydrates, fibres, amino acids, proteins, soluble sugars, vitamins, minerals, organic acids, and several bioactive compounds. This jelly-like material is raw aloe vera gel.

Still within the extracting step 10, the raw gel is then blended and filtered to obtain aloe vera gel. The aloe vera gel may also be termed clear aloe vera gel solution.

The fine transparent AV is then sterilized 12 at 70° C. in an oven. The purpose of this step is to ensure that the resulting film is sterile and does not introduce unwanted foreign matter or pathogens into the packaging with which the film is used.

For the preparation of the final edible film solutions, multiple steps are involved.

First, stock solution of 1% chitosan (CH) is prepared 14 in 1% lactic acid in distilled water (v/v). This dissolution of chitosan into an aqueous solution results in a chitosan solution.

Chitosan (β-(1-4)-2-acetamido-D-glucose and β-(1-4)-2-amino-D-glucose units) is advantageously inert and biodegradable in nature, and has antimicrobial and antioxidant properties, which make it advantageous compared to other potential additives. Chitosan (CH) is a natural cationic polysaccharide obtained from Chitin which naturally occurs in the hard shell of lobster, shrimp, snails, and other sea animals. Chitin is converted to CH by demineralization, deproteinization, discoloration, and deacetylation. The molecular structure of CH is composed of hydroxyl groups, oxygen molecules, and amino groups, which give the CH ion exchange, flocculation, and viscous properties. The structural properties of CH vary according to the degree of deacetylation, molecular weight, and product grade. Despite its advantages, CH still needs improvements regarding its thermal and mechanical stability; and water vapor permeability properties which are important factors of edible films and coatings. The inventors discovered that films composed of pure CH are highly permeable to water vapor, which is not a suitable requirement for food packaging industries, especially in humid environments. To overcome these disadvantages, the inventors surprisingly identified that modifying the CH, by the blending of CH with aloe vera gel, achieves optimized permeability characteristics.

Mixing 16 then occurs by homogenizing 60 ml of the CH solution (1%, w/v) with 40 ml of the AV gel and labeled as CH:AV (60:40). In embodiments, this is termed the first solution.

Homogeneity of the formulation can be confirmed by measuring the absorbance of solutions at 600 nm just after the preparation of solutions. The same formulation was kept stable for 24 hours in sterile tubes. Afterward, absorbance from the lower and upper portions of the solution was taken to check the differences. The homogenous formulation was analyzed to measure the viscosity, pH, antioxidant properties (DPPH and ABTS method), particle size, zeta potential, and polydispersity index. The results are mentioned in Table 1, below. These properties are important in the optimization of the film preparation solution. Once the film is formed successfully then these properties help with being able to reproduce the film.

TABLE 1

The Zeta-potential, polydispersity index (PDI), particle size, Viscosity, pH, DPPH scavenging %, and ABTS scavenging % of the edible film solutions.
Edible film solution

| Sr. No. | Parameters | Result |
|---|---|---|
| 1 | Zeta potential (mV) | 56.6 |
| 2 | Polydispersity index (%) | 0.08 |
| 3 | Particle size (μm) | 1.43 |
| 4 | Viscosity | 43.4 |
| 5 | pH | 3.41 |
| 6 | DPPH scavenging % | 9.16 |
| 7 | ABTS scavenging % | 25.31 |

The results of the edible film solution show good antioxidant activity along with rheological parameters (Table 1).

Afterward, edible films are prepared using the above solution by a casting step 18. A volume of 20 mL is poured into 90 mm Petri dishes.

The volume is then dried 20 at room temperature. After drying, the films are peeled off using forceps and kept at ambient conditions (25±2° C. and 55±1% relative humidity).

The films were used immediately for measuring color, opacity, water solubility (WS), water vapour permeability (WVP), scanning electron microscopy (SEM) and X-ray diffraction (XRD), mechanical properties, and fourier transform infrared (FTIR) spectroscopy.

Figure 3:
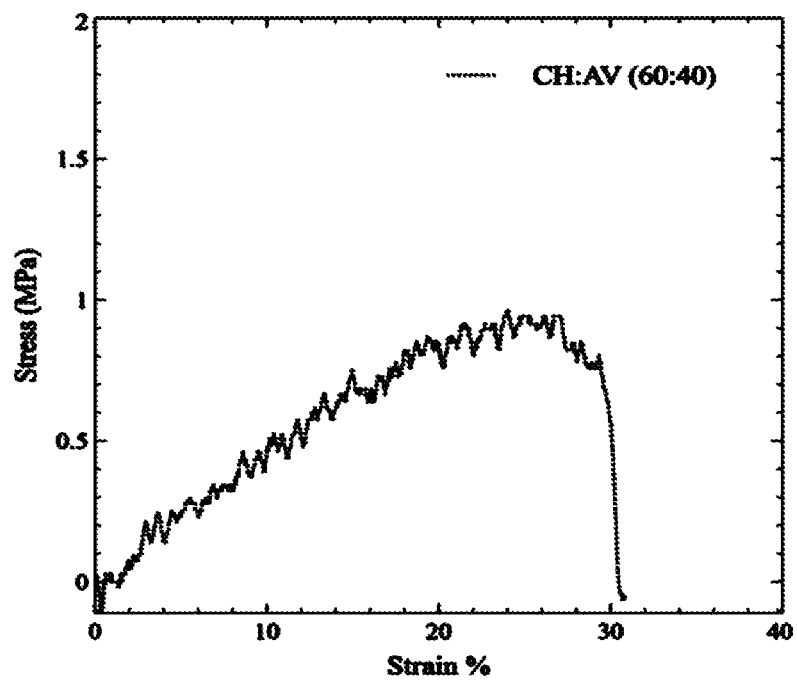
FIG. 3 shows a stress v/s strain % plot of an edible film according to an embodiment of the present disclosure.

The results of color, opacity, water solubility, water vapor permeability, and mechanical properties are mentioned in Table 2. The results show that the film is transparent in nature with very low opacity. The film is also quite water soluble in nature with enhanced water vapor permeability. The mechanical properties of the film also showed good strength. The stress v/s strain % plot as shown in FIG. 3 shows a high strain % which is also a good indicator of the mechanical strength of the film.

TABLE 2

Color, Opacity, Water solubility (WS), Water vapor permeability (WVP) properties, and mechanical properties of edible films formed from Chitosan and Aloe vera-based solution.

| Sr. No. | Parameters | Result |
|---|---|---|
| 1 | Color | |
| 1.1 | L* | 23.31 |
| 1.2 | a* | −0.18 |
| 1.3 | b* | 0.19 |
| 1.4 | Chroma | 1.35 |
| 2 | Opacity | 2.36 |
| 3 | WS | 39.1 |
| 4 | WVP (gm−2 h−1 Pa−1 mm) | 0.082 |
| 5 | Mechanical properties | |
| 5.1 | Tensile strength (MPa) | 0.006 |
| 5.2 | Strain | 33 |
| 5.3 | Young Modulus (MPa) | 3.61 |
| 5.4 | Film Thickness (mm) | 0.042 |

The surface morphology of the film was investigated using SEM which showed a smooth and plain texture. The XRD graph showed a single peak which reflects the amorphous nature of the film. The chemical bonds present in the film were detected using FTIR to check whether the preparation of the film has changed the chemical nature of the material. The results showed the presence of bonds at desired wavelengths.

Figure 4:
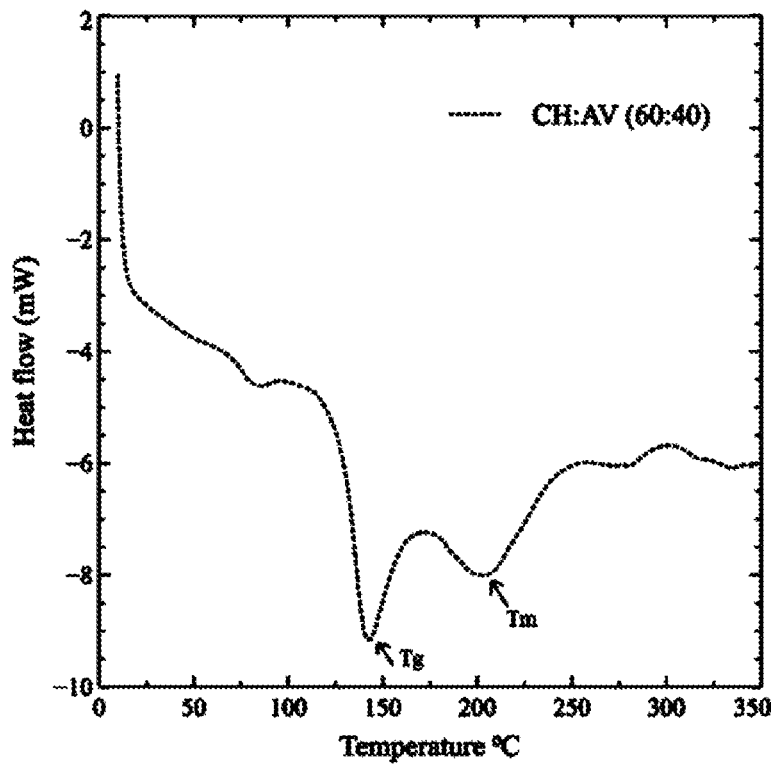
FIG. 4 shows thermal characteristics of an edible film according to an embodiment of the present disclosure.

FIG. 4 shows the thermal characteristics of the films. The results show that the film can tolerate up to 200° C. temperature which is quite far from normal storage conditions. Even the glass-transition temperature Tg at 150° C. is far above typical storage conditions.

Figure 2A:
FIGS. 2A-2C show a food packaging comprising an edible film according to embodiments of the present disclosure.

FIG. 2A shows a food packaging comprising an edible film according to an embodiment of the present disclosure.

The packaging 100 encloses the food, and the film 102 is provided on at least one outer surface of the packaging 100. In embodiments, the film completely encloses the packaging.

Figure 2B:
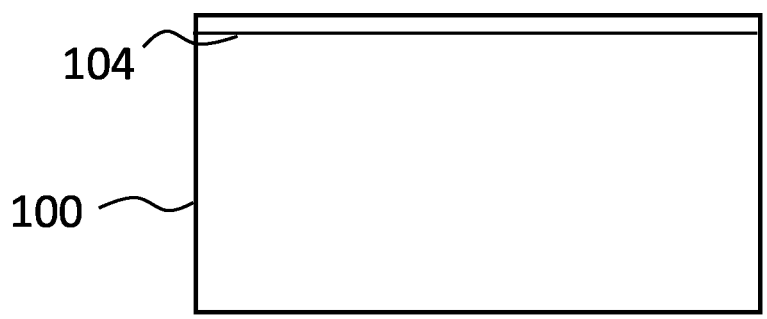

FIG. 2B shows a food packaging comprising an edible film according to an embodiment of the present disclosure.

The packaging 100 encloses the food, and the film 104 is provided on at least one internal surface of the packaging 100. In embodiments of the present disclosure, the film is provided on all internal walls of the packaging. In embodiments of the present disclosure, the film replaces at least one of the walls of the packaging. In embodiments of the present disclosure, the film replaces at least part of one of the walls of the packaging.

Figure 2C:
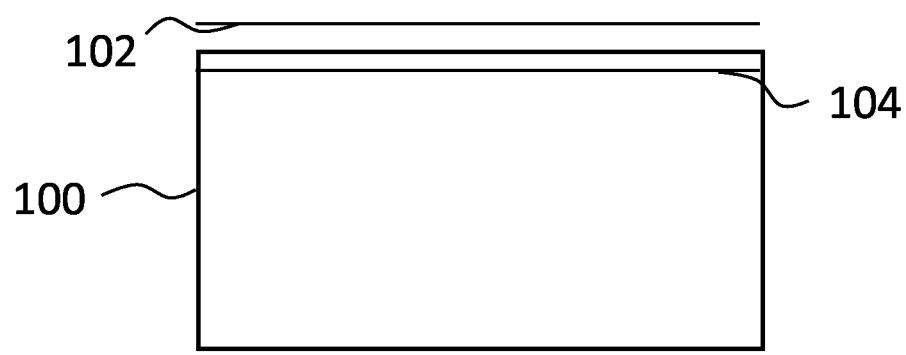

FIG. 2C shows a food packaging comprising an edible film according to an embodiment of the present disclosure.

The packaging 100 encloses the food, and the film 104 is provided on at least one internal surface of the packaging 100, and an additional film 102 is provided on at least one outer surface of the packaging 100. In such embodiments, the packaging is double layered with the film.

To assess the ability of the edible film in food preservation, fig fruits were experimented on.

The solution used to prepare the film was applied as coatings on fig fruits, and then allowed to set and dry. Fruits treated with water alone are considered as control.

Figure 5A:
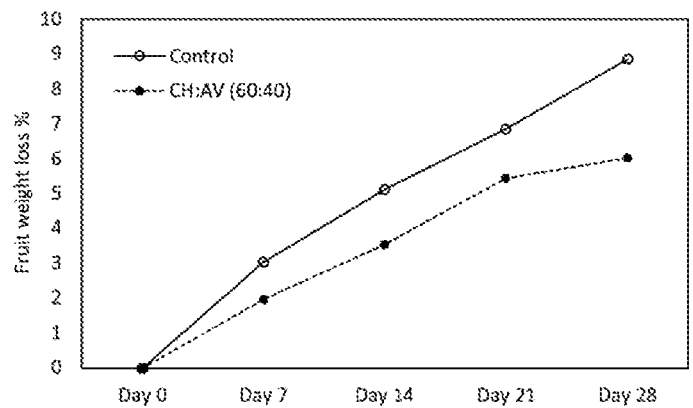
FIG. 5A shows fruit weight loss over time for filmed and non-filmed fruit according to an embodiment of the present disclosure.
Figure 5B:
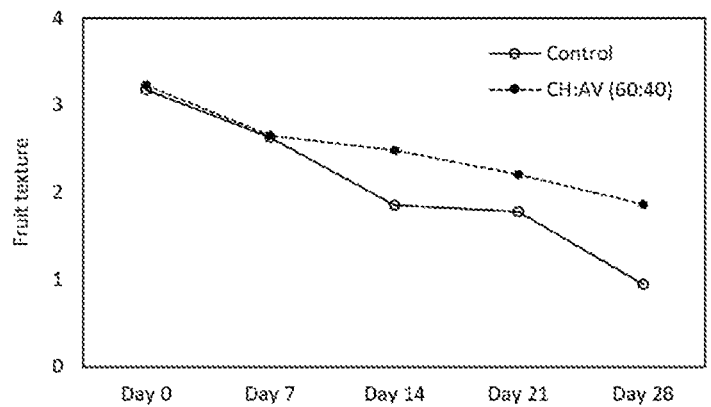
FIG. 5B shows fruit texture over time for filmed and non-filmed fruit according to an embodiment of the present disclosure.

The fruits were analyzed every week for weight loss, texture, and degradation. A significant reduction in weight loss, texture, and degradation was observed in coated fruits as compared to control fruits as shown in FIG. 5A and FIG. 5B.

Figure 6:
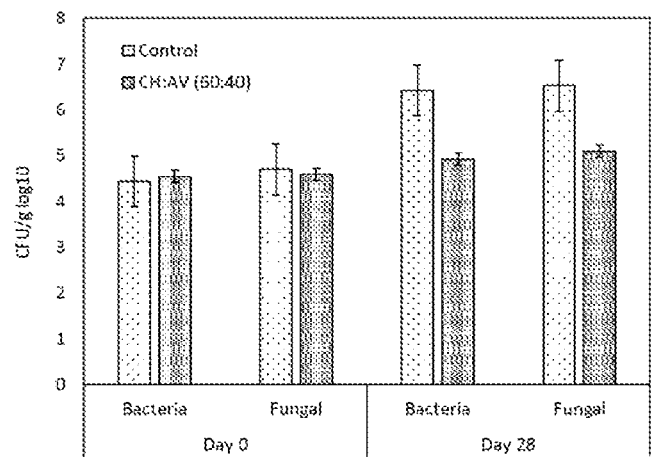
FIG. 6 shows microbial load over time for filmed and non-filmed fruit according to an embodiment of the present disclosure.

The microbial load on fruits was counted before and after 28 days of cold storage and results showed significant prevention from microbes in coated fruits in comparison with control fruits, as shown in FIG. 6.

The results shown demonstrate improved performance of films that are composed of chitosan combined with aloe vera gel according to the methods of embodiments of the present disclosure. A significant improvement can be observed in the melting temperature, surface morphology, water solubility, and water vapor permeability of the film CH:AV. These improvements can also be seen in the Zeta potential, Polydispersity index, Particle size, thermal stability, SEM, XRD, FTIR, water solubility, and water permeable properties. The overall results suggest that the film as described in embodiments of the present disclosure functions as an active food packaging material that can be employed to improve the shelf life and maintain the quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. An edible film for preserving fruit and vegetable crops, wherein the edible film consists essentially of:
   between 85 and 96 wt % aloe vera extract;
   between 2 and 10 wt % chitosan; and
   between 2 and 5 wt % lactic acid.

2. An edible film according to claim 1, wherein the edible film consists of:
   between 85 and 96 wt % aloe vera extract;
   between 2 and 10 wt % chitosan; and
   between 2 and 5 wt % lactic acid.

3. A solution for the preparation of an edible film according to claim 1, the solution consisting essentially of between 35-45 vol % aloe vera gel and between 55-65 vol % chitosan solution, wherein the chitosan solution comprises 0.5-1.5% v/v lactic acid.

4. A solution according to claim 3, wherein the chitosan solution comprises between 0.5-1.5% w/v chitosan.

5. A solution according to claim 3, wherein the total vol % of both the aloe vera gel and the chitosan solution is at least 99 vol %.

6. A method for forming an edible film, according to claim 1, for preserving fruit and vegetable crops, the method comprising the steps of:
   extracting aloe vera gel from aloe vera;
   dissolving between 0.5-1.5% w/v chitosan into an aqueous solution to form a chitosan solution, wherein the aqueous solution is lactic acid solution wherein the lactic acid solution comprises 0.5-1.5% v/v lactic acid in water;
   mixing the aloe vera gel with the chitosan solution to form a first solution;
   casting a film solution into a film, the film solution comprising at least 90 vol % of the first solution and less than or equal to 10 vol % of a second solution; and
   drying the film to form the edible film.

7. A method for forming an edible film according to claim 6, wherein the step of mixing comprises mixing between 35-45 ml of the aloe vera gel with between 55-65 ml of the chitosan solution.

8. A method for forming an edible film according to claim 6, wherein the step of extracting comprises blending and filtering the aloe vera to form the aloe vera gel.

9. A method for forming an edible film according to claim 6, wherein the method comprises a step of sterilizing the aloe vera gel by raising the temperature of the gel for a predetermined amount of time.

10. A method for forming an edible film according to claim 9, wherein the temperature is between 65 and 80 degrees Celsius.

11. A packaging for food comprising the edible film according to claim 1.

12. A method of preserving fruit and/or vegetable crops, wherein said method comprises forming a thin layer or semi-permeable barrier around the surface of said fruit and/or vegetable crops to minimize its contact with the external environment, wherein said thin layer or semi-permeable barrier is formed by an edible film, according to claim 1.

* * * * *